United States Patent [19]

Crockett et al.

[11] Patent Number: 5,015,823
[45] Date of Patent: May 14, 1991

[54] HIGH MANGANESE CONTAINING WELD BEAD AND ELECTRODE FOR PRODUCING SAME

[75] Inventors: Dennis D. Crockett, Mentor; Robert P. Munz, Jefferson, both of Ohio

[73] Assignee: The Lincoln Electric Company, Cleveland, Ohio

[21] Appl. No.: 396,833

[22] Filed: Aug. 21, 1989

Related U.S. Application Data

[63] Continuation of Ser. No. 159,458, Feb. 18, 1988, abandoned, which is a continuation of Ser. No. 940,867, Dec. 12, 1986, abandoned.

[51] Int. Cl.$^5$ .............................................. B23K 35/22
[52] U.S. Cl. .......................... 219/146.1; 219/146.22; 219/137 W M
[58] Field of Search ......... 219/146.1, 146.22, -146.24, 219/146.32, 146.41, 146.52, 137 W M; 428/544, 61 S; 148/329; 420/72-74

[56] References Cited

U.S. PATENT DOCUMENTS

| | | | |
|---|---|---|---|
| 1,892,316 | 12/1932 | Mitchell | 420/74 X |
| 2,024,992 | 12/1935 | Wissler et al. | 219/146.1 |
| 2,026,468 | 12/1935 | Hall . | |
| 2,156,299 | 5/1939 | Leitner et al. | 420/74 X |
| 3,163,526 | 12/1964 | Harpster | 148/329 X |
| 3,711,276 | 1/1973 | Hellner et al. | 420/74 |
| 4,071,734 | 1/1978 | Zarechensky et al. | 219/146.31 |

FOREIGN PATENT DOCUMENTS

| | | | |
|---|---|---|---|
| 3605778 | 7/1979 | Australia . | |
| 785237 | 5/1978 | Canada | 420/74 |
| 1239794 | 6/1960 | France . | |
| 81415 | 3/1963 | France . | |
| 2333610 | 5/1977 | France . | |
| 59597 | 5/1981 | Japan | 219/146.31 |
| 200543 | 12/1982 | Japan | 420/74 |
| WO84/01175 | 3/1984 | PCT Int'l Appl. | 420/74 |
| 1310183 | 7/1973 | United Kingdom . | |

*Primary Examiner*—Leo P. Picard
*Assistant Examiner*—Lincoln Donovan
*Attorney, Agent, or Firm*—Body, Vickers & Daniels

[57] ABSTRACT

A high manganese weld bead and electrode for producing same which has higher abrasion resistance and hardness than heretofore and is economical to manufacture. The deposit contains approximately 0.4-0.7% C, 10-16% Mn and 4.5 to 7.5% Cr.

13 Claims, No Drawings

HIGH MANGANESE CONTAINING WELD BEAD AND ELECTRODE FOR PRODUCING SAME

This is a continuation of Ser. No. 159,458 filed Feb. 18, 1988.

This invention pertains to the art of electric arc welding and, more particularly, to a high manganese containing, abrasive-resistant, weld bead analysis and a flux-cored electrode for producing same.

BACKGROUND

Austenitic manganese steels containing 10 to 14% manganese are frequently used to resist wear from severe impact and moderate abrasion in many industrial applications such as: rail crossovers; frogs and switchpoints; crusher hammers; dredge parts; rolling mill parts; drive sprockets, and the like. In such applications, the wear surface usually is provided either by: welding a plate or part of this high manganese containing steel to a plain carbon or low alloy steel structure; by hardfacing a worn surface using a high manganese containing electrode; or by rebuilding the structure by removing the worn surface and welding a new part of high manganese steel in its place.

In either case, an electrode is employed comprised of a tube of low carbon steel with the inside filled with various known fluxing ingredients to give a smooth arc, minimum spatter and operator appeal, and alloying ingredients, primarily large amounts of manganese, and lesser amounts of nickel, chromium and carbon, all in amounts and ratios which will produce the desired optimum alloy content in the deposited weld bead.

While hardness and abrasion resistance are of the utmost importance, the ability to weld one high manganese containing steel to another piece of high manganese containing steel, or to a piece of plain carbon or low alloy steel without cracking is likewise important. Thus, in one instance, in the prior art, one manufacturer supplied one electrode for hardsurfacing and another electrode for the welding of a high manganese containing steel part to a plain carbon or low alloy steel part. In the alternative, it is the practice to sacrifice abrasion resistance in the weld bead for the ability to also weld the high manganese containing steel to plain carbon or low alloy steel parts without cracking using the same electrode.

A third approach taken in prior art electrodes is to sacrifice arc action and welding characteristics to obtain crack resistance at the desired abrasion resistance level. This compromise is made by using a slag system containing little or no $TiO_2$. This results in a very low titanium residual in the weld deposit which minimizes cracking at the carbon levels necessary for good abrasion resistance. The welding characteristics of this system, however, are undesirable due to a very globular type of metal transfer that produces high metal spatter levels, poor weld bead surface appearance, and narrower bead profiles that do not permit a smooth tie-in to adjacent weld beads.

A further problem in the design of electrodes for producing the high abrasion resistant welds or weld surfaces is in the cost of the alloying ingredients. Large amounts of alloys are employed and it is desirable to produce the high abrasion resistance at a minimum cost. This requires using the minimum amount of total fill in the electrode along with alloying ingredients in a low cost form.

In the design of a high manganese electrode, it is conventional to test the abrasion resistance by subjecting identical specimens of 0.30% carbon steel and of the high manganese containing steel to an identical abrasion test consisting of pressing the specimens against a slowly rotating, water cooled grinding wheel under relatively high pressure for predetermined identical periods of time and measuring the amount of metal abraded away from each specimen. The abrasion resistance rating is then determined by dividing the amount of metal removed from the 0.30% carbon steel specimen by the amount of metal removed from the high manganese containing specimen. Heretofore an abrasion resistance rating of 5 to 7 times that of 0.30% carbon steel was considered satisfactory.

THE INVENTION

The present invention contemplates a new and improved high manganese, weld bead analysis and an electrode for producing same which has a higher abrasion resistance rating than heretofore thought possible, excellent operator appeal, and a relatively low cost.

In accordance with the present invention, a weld bead deposit is provided having the following deposit chemistry: 0.4 to 0.7% Carbon; 10.0 to 16.0% Manganese: 4.5 to 7.5% Chromium: the balance being iron and other minor alloying ingredients, such as nickel, aluminum and silicon plus purities.

Further in accordance with the invention, the weld bead analysis contains up to 1.0% silicon to better handle rust and scale and for improved bead wetting and bead surface, up to 0.20% maximum aluminum, which minimizes the oxidation loss of chromium in the welding arc. 0.25% to 1.5% nickel, which improves the crack resistance and 0 to 0.30% titanium, which further increases hardness and enhances abrasion resistance.

A typical weld bead analysis illustrating a preferred embodiment of the invention is as follows:

| % C | % Mn | % Si | % Al | % Ni | % Cr | % Ti |
|---|---|---|---|---|---|---|
| .49/.60 | 12.0/14.5 | .20/.45 | .01/.10 | .40/.65 | 5.0/7.0 | .15/.25 |

Such an analysis has an abrasion resistance rating of 9 to 13 and a Rockwell C hardness of 18 to 28 as compared to 12 to 23 Rockwell C for prior art electrodes.

Typical weld bead analysis and physical characteristics of competitive electrodes known to applicant and by applicant's assignee prior electrode are as follows:

|  | Competitor | | Assignee |
|---|---|---|---|
|  | I | II |  |
| % C | .872 | .232 | .468 |
| % Mn | 15.0 | 17.5 | 13.0 |
| % Si | .37 | .43 | .35 |
| % Ni | .35 | .65 | 2.03 |
| % Cr | 2.85 | 17.3 | 3.90 |
| % Al | <.01 | <.01 | .03 |
| % Ti | <.01 | .15 | .16 |
| % Fe | Bal. | Bal. | Bal. |
| Abrasion Resistance Rating | 8.2 | 6.9 | 5.7 |
| Hardness Rc | 22.6 | 21.8 | 17.8 |

An electrode capable of producing such a weld bead deposit in accordance with the invention, is comprised of a tube of low carbon steel having as a core material, slag forming components and alloying components generally as follows in percents by weight:

|  | Minimum | | Maximum | |
| --- | --- | --- | --- | --- |
|  | % of Fill | % of Electrode | % of Fill | % of Electrode |
| Na$_2$O | 0.6 | .17 | 1.3 | .41 |
| MgO | 1.5 | .43 | 2.2 | .69 |
| TiO$_2$ | 10.0 | 2.8 | 15.0 | 4.7 |
| CaF$_2$ | 6.0 | 1.7 | 9.0 | 2.8 |
| C | 1.4 | .40 | 2.3 | .72 |
| Al | 1.0 | .3 | 1.8 | .7 |
| Si | .5 | .14 | 1.9 | .60 |
| Cr | 13.7 | 4.0 | 18.5 | 5.8 |
| Mn | 45.0 | 12.8 | 49.0 | 15.5 |
| Ni | 1.2 | .34 | 1.9 | .60 |
| Fe | 8.5 | 2.7 | 11.2 | 3.2 |

|  | Preferred | |
| --- | --- | --- |
|  | % of Fill | % of Electrode |
| Na$_2$O | 1.0 | 0.3 |
| MgO | 1.8 | .54 |
| TiO$_2$ | 11.9 | 3.6 |
| CaF$_2$ | 7.6 | 2.3 |
| C | 1.9 | .57 |
| Al | 1.4 | .42 |
| Si | 1.5 | .45 |
| Cr | 14.5 | 4.4 |
| Mn | 45.8 | 13.7 |
| Ni | 1.5 | .45 |
| Fe | 10.2 | 3.1 |
| Tube |  | Balance |

The various ingredients on the inside of the tube comprise approximately 30% of the total weight of the electrode.

The TiO$_2$ is the main slag component and promotes the desirable arc characteristics, helps provide a slag coating to better shield the weld metal crossing in the arc, provides a slag cover over the deposited weld, and controls the weld metal fluidity for optimum weld bead shape.

The Na$_2$O enhances arc stability and helps control the melting range of the slag coating on the deposited weld metal. Normally, sodium oxide is hygroscopic alone but is supplied in the more moisture stable form of Na$_2$TiO$_3$.

The calcium fluoride is an important ingredient and helps control the type of droplet transfer from the electrode to the weld pool in order to minimize oxygen and nitrogen contamination of the weld bead. This ingredient is also important in lowering the slag melting range and in providing good fluxing and wetting action to give a cleaner deposited weld bead.

Magnesium oxide provides a basic oxide for improved bead wetting and slag removal.

The manganese is supplied as a metal powder and, as is known, produces a tough austenitic manganese deposit.

The nickel is added to increase crack resistance in the deposited weld bead. Inasmuch as nickel powder is relatively expensive compared to the ferro-chromium, by using small amounts of nickel and higher amounts of chromium to obtain the desired physical characteristics the cost of the electrode and thus of the final weld is held down.

The chromium and carbon are supplied as a granular ferro-chromium carbide and these two ingredients together increase the abrasion resistance. A higher carbon level, while providing better abrasion resistance, tends to induce more cracking. Therefore, the carbon levels are important. Higher chromium levels alone do not improve abrasion resistance and require higher fill percentages and cost. Ferro-chromium carbide is less expensive than chromium carbide.

The aluminum is added to help prevent oxidation loss of chromium crossing the arc and provides a scavenger for nitrogen.

The silicon has a minor role to help deoxidation and improved bead wetting and gives a smooth weld surface.

The principal object of the invention is the provision of a new and improved weld bead analysis which has a higher abrasion resistant rating than heretofore with a low tendency to crack when used to weld austenitic manganese steel to other austenitic manganese steel or to plain carbon or low alloy steel.

Another object of the invention is the provision of a new and improved electrode which produces a high manganese, abrasion resistant deposit, and which has high deposition rates, low spatter loss and low cost per pound.

Another object of the invention is the provision of a new and improved welding electrode for better abrasion resistant welding which has excellent operator appeal with minimum spatter and good bead wetting.

The invention has been described with reference to a preferred embodiment, modifications of which will occur to others upon a reading and understanding of this specification and it is my intention to include all such modifications insofar as they come within the scope of the appended claims or the equivalent thereof.

Having described my invention, I claim:

1. An electrode for depositing high manganese abrasion resistant weld beads comprised of a tube of carbon steel having a fill of the following ingredients as a percent of the total electrode weight:

|  | Min. | Max. |
| --- | --- | --- |
| Na$_2$O | .17 | .41 |
| Mgo | .43 | .69 |
| TiO$_2$ | 2.8 | 4.7 |
| CaF$_2$ | 1.7 | 2.8 |
| C | .40 | .72 |
| Al | .3 | .7 |
| Si | .14 | .60 |
| Cr | 4.0 | 5.8 |
| Mn | 12.8 | 15.5 |
| Ni | .34 | .60 |
| Fe | 2.7 | 3.2 |
| Tube | Balance | Balance. |

2. The electrode of claim 1 wherein the ingredients are as follows as percent of the total electrode weight:

| Na$_2$O | .3 |
| --- | --- |
| MgO | .52 |
| TiO$_2$ | 3.6 |
| CaF$_2$ | 2.3 |
| C | .57 |
| Al | .42 |
| Si | .45 |
| Cr | 4.4 |
| Mn | 13.7 |
| Ni | .45 |
| Fe | 3.1 |
| Tube | Balance |

3. A cored electrode for producing high abrasion resistant weld bead upon cooling from a molten state in an electric arc welding process, said bead having the following deposit chemistry by weight: 0.4% to 0.7% carbon; 10.0 to 16.0% manganese; 4.5 to 7.5% chromium; the balance being iron and other minor alloying ingredients, said electrode comprising a low carbon steel tube and a titanium dioxide slag forming system.

4. The electrode of claim 3 wherein the weld bead includes silicon up to 1.0%.

5. The electrode of claim 3 wherein the weld bead includes aluminum up to 0.20%.

6. The electrode of claim 3 wherein the weld bead includes nickel in the range of 0.25 to 1.5%.

7. The electrode of claim 3 wherein the weld bead includes titanium up to 0.30%.

8. A cored electrode for depositing a highly abrasive resistant weld bead in an electric arc welding process, said weld bead having the following chemistry by weight: carbon in the range of 0.4 to 0.7%; manganese in the range of 10.0 to 16.0%; chromium in the range of 4.5 to 7.5%; silicon up to 1.0%; aluminum up to 0.20%; nickel in the range of 0.25 to 1.5%; and titanium up to 0.30%; the balance being iron.

9. A cored electrode for producing a high abrasion resistant weld bead having the following deposit chemistry by weight: 0.49–0.60 percent carbon; 12.0–14.5 percent manganese; 5.0–7.0 percent chromium; the balance being iron and other minor alloying ingredients, said electrode comprising a low carbon steel tube and titanium dioxide slag forming system.

10. A cored electrode for depositing a highly abrasive resistant weld bead in an electric arc welding process, said bead having the following chemistry by weight: 0.49 to 0.60% carbon; 10.0 to 16.0% manganese; 5.0 to 7.0% chromium; 0./40 to 0.65% nickel; the balance being iron and other minor alloying ingredients, said electrode comprising a low carbon steel tube and a titanium dioxide slag forming system.

11. The electrode of claim 10 wherein said bead chemistry includes 0.0 to 1.0% silicon.

12. The electrode of claim 11 wherein said bead chemistry includes 0.0 to 0.2% aluminum.

13. The electrode of claim 12 wherein said bead chemistry includes 0.0 to 0.3% titanium.

* * * * *